United States Patent [19]

Kondo et al.

[11] 4,220,418
[45] Sep. 2, 1980

[54] SUSPENSION BALL JOINT MOUNTING MECHANISM

[75] Inventors: Takeo Kondo; Yutaka Inuzuka, both of Toyota, Japan

[73] Assignee: Toyota Jidosha Kogyo Kabushiki Kaisha, Aichi-ken, Japan

[21] Appl. No.: 956,984

[22] Filed: Oct. 31, 1978

[30] Foreign Application Priority Data

May 16, 1978 [JP] Japan .............................. 53/64607[U]

[51] Int. Cl.² ............................................. F16C 11/06
[52] U.S. Cl. ....................................... 403/76; 403/134; 277/212 FB
[58] Field of Search ................. 277/212 FB; 403/134, 403/76, 122, 135, 140, 138, 139, 132, 133, 136; 280/674, 673

[56] References Cited

U.S. PATENT DOCUMENTS

| 2,197,037 | 4/1940 | Gardner | 403/134 |
| 2,397,464 | 4/1946 | Booth | 403/134 |
| 2,752,178 | 6/1956 | Hoffman | 403/140 X |
| 3,343,855 | 9/1967 | Husen | 277/212 FB |
| 3,391,952 | 7/1968 | Zeigler | 403/51 |

Primary Examiner—Andrew V. Kundrat
Attorney, Agent, or Firm—Browdy and Neimark

[57] ABSTRACT

A suspension ball joint mounting mechanism in which a steering knuckle arranged swivelably in the steering operation is forked at its end by a slit. A stud portion of a ball joint stud assembly is passed through the forked portion of the steering knuckle and fastened in position by bolting, the ball portion of the ball joint stud assembly being pivotally supported to a support seat of a suspension arm so that said both portions are able to make a relative movement to each other. A dust cover is provided to sheath the support seat and steering knuckle. A plate washer is disposed between the entire area of the edge ring face of the lip portion of the dust cover and the corresponding face of the steering knuckle to allow smooth relative sliding movements thereof. Thus, the sealing performance of the joint mechanism is improved, while ensuring wear resistance thereof.

12 Claims, 7 Drawing Figures

SUSPENSION BALL JOINT MOUNTING MECHANISM

BACKGROUND OF THE INVENTION

This invention relates to a mounting mechanism for a suspension ball joint provided between the steering knuckle and suspension arm for the front wheels of automobiles.

As is well known in the art, the steering mechanism for the front wheels of automobiles is usually provided with so-called suspension ball joints between the suspension arms and steering knuckle to provide a high wheel steering flexibility. Various types of suspension ball joint mechanisms such as wishbone type, MacFerson type, as well as other types, have been developed, improved and adapted for practical uses.

A typical example of such suspension ball joint mounting mechanisms known in the art includes a ball joint stud assembly having its ball portion pivotally supported by spherical seats fitted in the corresponding sockets in a support seat assembly suitably secured to a suspension arm. The stud portion of the ball joint stud assembly is passed through the forked portion of the steering knuckle and joined at its end by a suitable means, for example, by screwing a nut into the corresponding threaded portion. An annular boot-like dust cover is provided around the proximal end portion of the support seat assembly such that the lip portion at the opposite edge of the dust cover will provide axial seal at a thrust sleeve for the stud portion, while a lip portion at the upper edge provides facial seal for a lower chamferred portion of the steering knuckle. The lip portion also contacts, on its outer side, directly with the dust cover and the underside of the forked portion at the end of the steering knuckle.

In this known type of suspension ball joint mounting structure, sealing is basically provided in the steering operation by direct contact of the lip portion of the dust cover with the underside of the steering knuckle, so that there is inevitably induced a tendency of a relative facial sliding motion and the stealing performance is worsened because of such sliding motion and resultant positional variation. Also, the elastic material of the dust cover becomes fatigued with time, thus furthering deterioration of sealing performance. It is to be particularly noted that biting, relative sliding motion positional variation resulting from said direct contact with the underside of the forked portion of the steering knuckle afford repetitive mechanical load to the neck portion of said dust cover to affect the sealing performance of the lip portion. Also, biting or cracking may be caused on the underside of the forked portion because of its edge action. These are additional shortcomings responsible for poor sealing performance in the above-described conventional ball joint mounting mechanism.

SUMMARY OF THE INVENTION

In view of the problems in mounting of the suspension ball joints for automobiles according to the conventional techniques, it is an object of the present invention to provide an improved suspension ball joint mounting mechanism according to which the ball joint stud assembly having its ball portion pivotally supported by a support seat secured to a suspension arm is fastened by a bolt to the forked portion of the steering knuckle, and a plate washer is disposed between the entire peripheral face of the edge ring on the lip portion of the dust cover and the corresponding face of the steering knuckle, thereby to noticeably improve the sealing characteristic of the joints.

It is another object of the present invention to provide an excellent suspension ball joint mounting mechanism which is specifically designed to be able to protect the lip portion of the dust cover from the sliding portion of the steering knuckle.

The foregoing objects, as well as others which are to become apparent from the text below, are achieved according to the present invention by providing an improved suspension ball joint mounting mechanism in which the ball joint stud assembly having its ball portion pivotally supported to a support seat of a suspension arm is secured in position by bolting it to the forked clamping portion of the steering knuckles, and a plate washer is provided sealedly between the entire edge surface of the dust cover and the corresponding face of the steering knuckle.

DETAILED DESCRIPTION OF THE PREFERRED EMBODIMENTS

Figure 1:
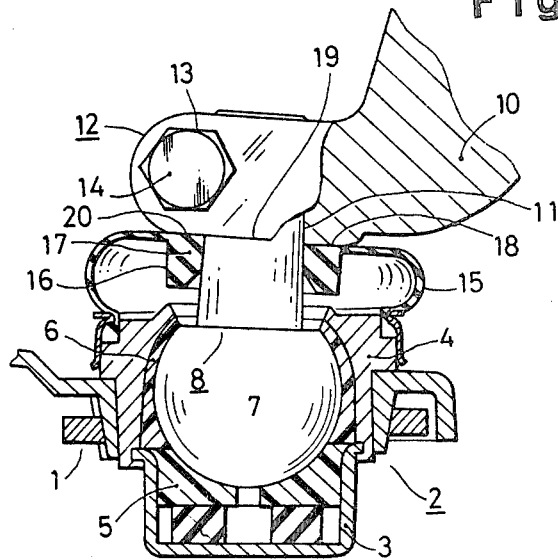
FIG. 1 is a sectional illustration of a suspension ball joint mounting mechanism according to the prior art.

Before turning to those figures of drawing illustrating the invention, a typical example of a conventional ball joint mounting mechanism is briefly described below, reference being made to FIG. 1.

A ball joint stud assembly 8 has its ball portion 7 pivotally supported by spherical seats 5 and 6 fitted in corresponding sockets 3 and 4 in a support seat assembly 2 suitably secured to a suspension arm 1, while a stud portion 9 of the ball joint stud assembly 8 is passed through a forked portion 11 of a steering knuckle 10 and joined at its end 12 by a suitable means, for example, by screwing a nut 14 into a corresponding threaded portion 13. An annular boot-like dust cover 15 is provided around the proximal end portion of the support seat assembly 2 such that a lip portion 18 at an opposite edge 16 of the dust cover will provide an axial seal at a thrust sleeve 17 for the stud portion 9, while a lip portion 19 at the upper edge provides a facial seal for the lower chamferred portion of the steering knuckle 10. Also, the lip portion 18 contacts, on its outer side, directly with said dust cover 14 and the underside 20 of the forked portion at the end 12 of the steering knuckle 10.

In this type of suspension ball joint mounting structure, sealing is basically provided in the steering operation by direct contact of the lip portion 18 of the dust cover 15 with the underside of the steering knuckle 10, so that there is inevitably induced a tendency of a relative facial sliding motion and the stealing performance is worsened because of such sliding motion and resultant positional variation. Also, the elastic material of the dust cover 15 become fatigued with time, thus furthering deterioration of sealing performance. It is to be particularly noted that biting, relative sliding motion and positional variation resulting from the direct contact with the underside 20 of the forked portion of the steering knuckle 10 afford repetitive mechanical load to the neck portion of the dust cover 15 to affect the sealing performance of the lip portion 18. Also, biting or cracking may be caused on the underside of the forked portion because of its edge action. These are additional shortcomings which result in poor sealing performance in conventional ball joint mounting mechanisms of the type improved by the present invention.

Figure 2:
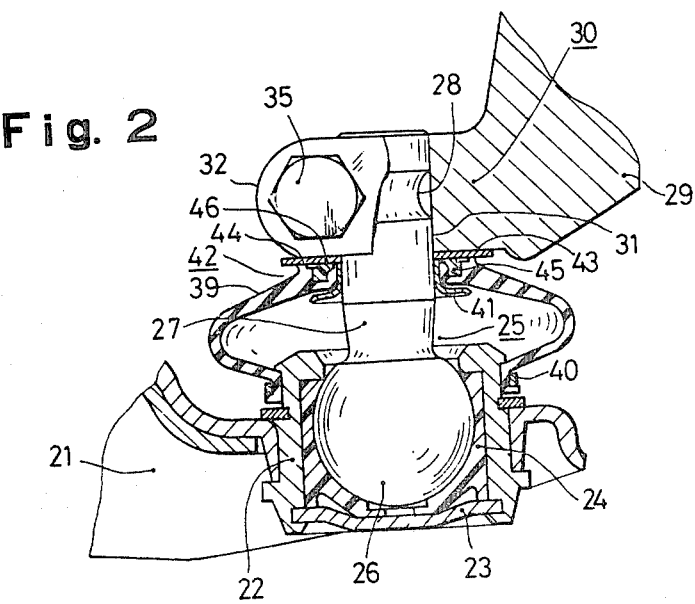
FIG. 2 is a sectional view showing an embodiment of the suspension ball joint mounting structure according to the present invention.
Figure 3:
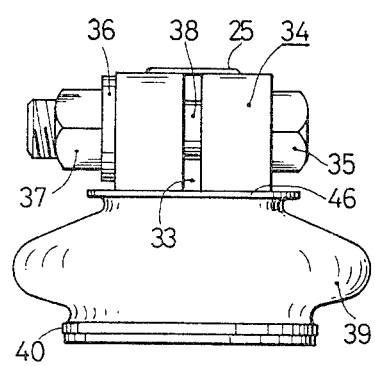
FIG. 3 is an illustrative, side view of the steering knuckle mounted portions of the dust cover and stud assembly.
Figure 4:
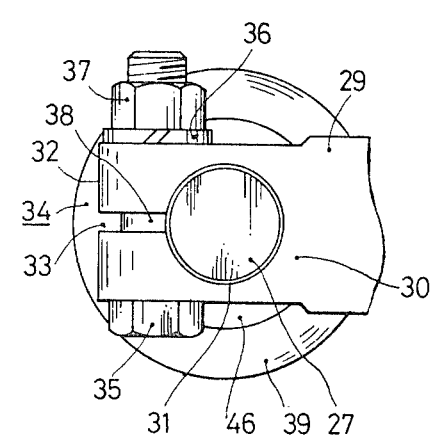
FIG. 4 is a plane view of the mechanism of FIG. 3.

In the embodiment of the mechanism shown in FIGS. 2 to 4, reference numeral 21 indicates a lower arm adapted to serve as a suspension arm, the arm having suitable secured to its end a socket 22 which serves as a supporting seat. Also, a spherical seat 24 made of a suitable resin is provided on the pressed-in (inner) side of the bottom seat 23 of the socket 22, and the ball portion 26 of a ball joint stud assembly 25 is pivotally supported through the medium of a grease (not shown).

It will be also seen that an arc-sectioned, ring-shaped notch 28 is provided annularly around an upper part of the stud portion 27 provided integrally with said ball portion 26.

Numeral 29 indicates a steering knuckle of which the mounting portion 30 is provided with a slit 33 extending sidewise from a stud receiving hole 31, having an inner diameter substantially equal to the outer diameter of the stud portion 27 to the distal end 32 to thereby form a forked clamping portion 34. A bolt 35 is threadedly fitted in the threaded part in the forked clamping portion 34 by a nut 37 via a washer 36 to fasten the stud portion 27 in position. Also, a shank 38 of the bolt 35 is engaged with the ring-shaped notch 28 of the stud portion 27, thereby to prevent accidental removal of the bolt while allowing relative turning motion of the members.

Numeral 39 refers to a dust cover made of a suitable material such as rubber, the lower end of the dust cover 39 being suitably secured to the socket 22 of the support seat assembly by a pinch ring 40 while the inside of its upper end is elastically pressed against the outer surface of a trumpet-shaped retainer 41 of metal and which, in turn, is suitably fitted on the external surface of the stud 27.

The top face of a lip portion 42 at the top end of the dust cover 39 is formed into a flat ring surface 44 corresponding to the flat machined face 43 of the steering knuckle 29 and is also fitted with a seal ring 45 made of a suitable resin.

Disposed between the ring face 44 at the top edge of the lip portion 42 of the dust cover 39 and the corresponding flat machined face 43 of the steering knuckle is a disc washer 46 of metal adapted to serve as a plate washer and arranged to fit over the stud 27, the washer 46 being sufficiently larger in outer diameter than the lip portion 42 of the dust cover 39.

According to this geometry, when the steering operation is performed by manipulating a handle (not shown), the steering knuckle 29 is turned and displaced via the steering mechanism, causing the concurrent turn and displacement of the integral stud portion 27 of the ball joint stud assembly 25, which is secured to the forked portion 34 of the fixing end 30 of the steering knuckle 29, so that the ball portion 26 is accordingly displaced in the spherical seat 24 of the socket 22 in the lower arm supporting seat assembly, thus allowing normal steering operation.

During this steering operation, since said disc washer 46 is fitted on the external surface of the stud 27 and the sleeve type retainer 41 contacts with said disc washer 46 bottomwise thereof and is also fitted against the external surface of the stud 27, both of these elements are turned and displaced integrally with the stud 27 or floatingly relative to one another. Consequently, the underside of the disc washer 46 is turned through an overall facial sliding motion relative to the top end flat ring face 44 of the lip portion 42 of the dust cover 39 and the seal ring 45, thus providing a first seal to prevent intrusion of muddy water, sand, dust and other alien matters, while the retainer 41 is also turned slidingly in contact with the inner peripheral face of the lip portion 42 to provide a second axial seal for additional assurance against intrusion of said alien matters.

It will be understood that a secondary sealing action is created between the upper side of the disc washer 46 and the underside of the mounting portion 30 of the steering knuckle 29.

Of course, the protective action of the three-dimensional seal for the ball portion 26 works effectively not only during the steering operation but also against the vibrations concomitant to bounding and rebounding of the vehicle during its motion over road surfaces and the like.

Also, since the slit 33 in the forked clamping portion 34 at the mounting end 30 of the steering knuckle 29 is in contact with the upper side of the disc washer 46, there is no possibility that, during any turning motion, the slit 33 would rub and damage the lip portion 42 of the dust cover 39 by direct contact therewith, and the lip portion 42 is maintained symmetrical axially.

The sealing function and protecting function for the lip portion 42 are provided not only for the normal operation where the fitted condition of the disc washer 46 and the retainer 41 to the stud 27 is maintained but also for a pattern of operation where the relative turning movement through relative facial sliding motion is produced fairly slowly between the disc washer 46 and the underside 43 of the mounting portion 30 of the steering knuckle 29.

Also, because of fitting of the seal ring 45 to the lip portion 42 of the dust cover 39, the rigidity of the lip portion is strengthened and it also remains free of any twisting force concomitant to the swivelling movements of the disc washer 46 and the retainer 41 during the steering operation, so that the normal seal function is maintained without inducing fatigue of the elements and further, the high elastic fitting action is retained properly.

Figure 6:
FIG. 6 is a front view of the washer of FIG. 5.
Figure 5:
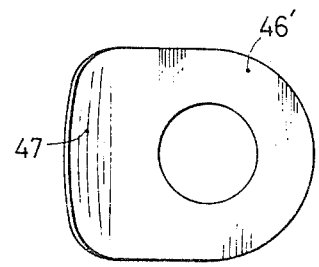
FIG. 5 is an illustrative plane view showing another embodiment of plate washer which can be used in the mechanism of the present invention.
Figure 7:
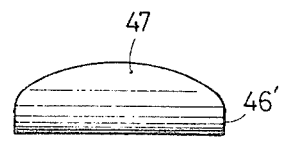
FIG. 7 is a left side view of the washer of FIG. 5.

This invention is not limited in its adaptability to the above-described embodiment but may be embodied in various other ways. For instance, as shown in FIGS. 5 to 7, the disc washer 46 in the embodiment illustrated in FIGS. 2-4 may be replaced with a plate washer 46' having a warped flange portion 47 at the part corresponding to the forked clamping portion 34 of the steering knuckle 29. Also, such washer may be formed in the shape of a polygon. The essential requirement is that such washer has a flat face capable of covering the entirety of the lip portion of the dust cover.

As described above, this invention features the novel mechanical arrangement for mounting of a suspension ball joint in which the ball portion of a ball joint stud assembly is pivotally supported to a support seat of a suspension arm while the stud portion is bolted to the forked clamping portion at the end of a steering knuckle, and a plate washer is disposed sealedly between the entire area of the edge ring face of the lip portion of a dust cover adapted to sheathe the mounted section of said support seat and stud portion and the corresponding face of the steering knuckle. This arrangement allows very smooth relative sliding movements of said washer and the lip portion of said dust cover during the steering operation and also ensures the lasting normal sealing function. Further, there is no possibility that fatigue of the lip portion of said dust cover be induced over the entire area thereof, and the proper dust sealing action is always ensured.

Employment of bolting clamp for the stud at the forked portion of the steering knuckle has the merit of facilitating the integral clamping, and further, since the slit and stud passing hole in said forked clamping portion are not in direct abutment with the lip portion of the dust cover but interposed by a plate washer, there is no likelihood of causing deformation or damage to the lip portion of said dust cover during the steering operation. This further adds to the excellent sealing performance of the mechanism according to this invention.

It will be obvious to those skilled in the art that various changes may be made without departing from the scope of the invention and the invention is not to be considered limited to what is shown in the drawings and described in the specification.

What is claimed is:

1. In a suspension ball joint mounting mechanismin which a ball portion of a ball joint stud assembly is pivotally supported to a support seat assembly secured to a suspension arm, a stud portion thereof is engaged with a steering knuckle and a dust cover is provided between the support seat assembly and the steering knuckle, the improvement wherein an end of said steering knuckle is slitted and forms a forked clamping portion for clamping said stud portion with a bolt, said dust cover includes a lip portion and an edge ring face, and a plate washer is provided sealedly between substantially the entire area of said edge ring face and said lip portion of said duct cover and a corresponding face of said steering knuckle, said plate washer being formed with a wasped flange portion at an end thereof.

2. A suspension ball joint mounting mechanism according to claim 1, wherein an annular ring groove, halfcircular in sectional shape, is provided in said stud portion of said ball joint stud assembly and engaged with said bolt of said forked steering knuckle.

3. A suspension ball joint mounting mechanism according to claim 1, wherein said plate washer has the shape of a polygon.

4. A suspension ball joint mounting mechanism according to claim 1, wherein a retainer is provided for said dust cover and fitted to said stud portion of said joint stud assembly.

5. A suspension ball joint mounting mechanism according to claim 4, wherein said retainer is an abutment against said plate washer from its lower side.

6. A suspension ball joint mounting mechanism according to claim 5, wherein a seal ring of synthetic resin is annularly mounted on said lip portion of said dust cover.

7. A suspension ball joint mounting mechanism according to claim 6, wherein said seal ring is in abutment against said plate washer from its lower side.

8. In a suspension ball joint mounting mechanism in which a ball portion of a ball joint stud assembly is pivotally supported to a support seat assembly secured to a suspension arm, a stud portion thereof is engaged with a steering knuckle and a dust cover is provided between the support seat assembly and the steering knuckle, the improvement wherein an end of said steering knuckle is slitted and forms a forked clamping portion for clamping said stud portion with a bolt, said dust cover includes a lip portion and an edge ring face, and a plate washer is provided sealedly between substantially the entire area of said edge ring face slitted said lip portion and; said dust cover and a corresponding face of said steering knuckle, wherein a retainer is provided for said dust cover and fitted to said stud portion of said joint stud assembly, and wherein said retainer is an abutment against said plate washer from its lower side.

9. A suspension ball joint mounting mechanism according to claim 8, wherein a seal ring of synthetic resin is annularly mounted on said lip portion of said dust cover.

10. A suspension ball joint mounting mechanism according to claim 9, wherein said seal ring is in abutment against said plate washer from its lower side.

11. A suspension ball joint mounting mechanism according to claim 8, wherein said plate washer is formed with a warped flange portion at an end thereof.

12. A suspension ball joint mounting mechanism according to claim 8, wherein said retainer is shaped as a trumpet-shaped flange and the outside edge of the trumpet shaped flange is overlaped to the lower position of the inner end of said lip portion of the dust cover.

* * * * *